US012613823B2

(12) United States Patent　　　　　(10) Patent No.:　US 12,613,823 B2
Lentmaier et al.　　　　　　　　　　　(45) Date of Patent:　　Apr. 28, 2026

(54) MODULAR COMMUNICATION SYSTEM AND METHOD FOR OPERATING THE COMMUNICATION SYSTEM

(71) Applicant: Murrelektronik GmbH, Oppenweiler (DE)

(72) Inventors: Steffen Lentmaier, Oppenweiler (DE); Ingo Wolff, Oppenweiler (DE); Bastian Baier, Oppenweiler (DE)

(73) Assignee: MURRELEKTRONIK GMBH (DE)

( * ) Notice: Subject to any disclaimer, the term of this patent is extended or adjusted under 35 U.S.C. 154(b) by 12 days.

(21) Appl. No.: 18/501,232

(22) Filed: Nov. 3, 2023

(65) Prior Publication Data

US 2024/0152472 A1　　May 9, 2024

(30) Foreign Application Priority Data

Nov. 4, 2022　(EP) ..................................... 22205641

(51) Int. Cl.
　G06F 13/362　　　(2006.01)
　G06F 13/42　　　(2006.01)
(52) U.S. Cl.
　CPC ........ G06F 13/362 (2013.01); G06F 13/4265 (2013.01)
(58) Field of Classification Search
　CPC ............. G06F 13/4247; G06F 13/4265; G06F 13/362; H04L 12/40019; H04L 2012/4026
　See application file for complete search history.

(56) References Cited

U.S. PATENT DOCUMENTS

| | | | | |
|---|---|---|---|---|
| 9,651,942 | B2 * | 5/2017 | Kolblin | ................... G06F 13/14 |
| 10,863,413 | B2 | 12/2020 | Franz et al. | |
| 10,963,412 | B2 * | 3/2021 | Karb | .................... G05B 19/054 |
| 11,018,893 | B2 * | 5/2021 | Spanjers | ........... H04L 12/40006 |

(Continued)

FOREIGN PATENT DOCUMENTS

| | | |
|---|---|---|
| CA | 2835535 A1 | 11/2012 |
| DE | 102018104171 A1 | 8/2019 |

(Continued)

OTHER PUBLICATIONS

IO-Link Wireless—"IO-Link Wireless Expose"; Version Mar. 2018; 8 pages (Year: 2018).*

(Continued)

*Primary Examiner* — Brian T Misiura
(74) *Attorney, Agent, or Firm* — Dilworth IP, LLC

(57)　　　　　　　ABSTRACT
A modular communication system for connection to a master unit, including a device which is configured in a decentralized manner and includes at least a first module and a second module, wherein the first module is configured and set up to be directly connected to the master unit, and wherein the second module is directly connected to the first module and is configured and set up to be indirectly connected to the master unit via the first module, wherein the first module is further configured and set up to receive a data signal from the master unit. The data signal includes at least a first data set usable by the first module, and at least a second data set usable by the second module. The present disclosure further relates to a summing frame method, to a block frame method and to an indexing method for operating the communication system.

12 Claims, 3 Drawing Sheets

(56) References Cited

U.S. PATENT DOCUMENTS

| | | | |
|---|---|---|---|
| 2006/0274746 A1 | 12/2006 | Kuschke et al. | |
| 2008/0082178 A1 | 4/2008 | Schroff et al. | |
| 2009/0121988 A1* | 5/2009 | Amo | G09G 3/32 |
| | | | 345/82 |
| 2012/0236873 A1 | 9/2012 | Steindl | |
| 2015/0134822 A1* | 5/2015 | Bhagwat | H04L 41/0803 |
| | | | 709/226 |
| 2016/0087446 A1* | 3/2016 | Zainaldin | H04L 12/10 |
| | | | 307/104 |
| 2016/0224306 A1* | 8/2016 | Rycyna, III | G09G 3/32 |
| 2019/0327662 A1 | 10/2019 | Franz et al. | |
| 2022/0188255 A1* | 6/2022 | Tang | G06F 13/4247 |
| 2023/0217311 A1* | 7/2023 | Farhoodi | H04W 28/14 |
| | | | 370/328 |

FOREIGN PATENT DOCUMENTS

| | | | |
|---|---|---|---|
| DE | 102018109576 B3 | 10/2019 | |
| DE | 102018109607 A1 | 10/2019 | |
| DE | 102020113663 A1 | 11/2021 | |
| WO | 2012155949 A1 | 11/2012 | |

OTHER PUBLICATIONS

IO-Link Handbook, Second Edition; Dated Apr. 2020; 68 Pages (Year: 2020).*

Reitmann, S. et al., Fieldbus Communication Scheme for Modular Converter Systems—Considerations for Minimal Switching Period and Low Data Latency, 2022 IEEE Energy Conversion Congress and Exposition (ECCE), Oct. 9, 2022, pp. 1-8.

* cited by examiner

MODULAR COMMUNICATION SYSTEM AND METHOD FOR OPERATING THE COMMUNICATION SYSTEM

FIELD OF THE DISCLOSURE

Embodiments of the present disclosure relate to a modular communication system. Embodiments of the present disclosure furthermore relate to a summing frame method, to a block frame method and to an indexing method for operating the communication system.

BACKGROUND

In numerous industrial plants and machines, sensors are used to collect signals, and actuators are used to activate specific functions. The machines expand in the three-dimensional space, as a result of which the sensors and/or the actuators are usually set up distributed in space.

For comparatively compact machines, a star-shaped arrangement of the sensors and/or actuators (star topology) has proven to be particularly useful and effective. In particular, the sensors and/or the actuators can be connected in a star-shaped manner to an collection point, for example an IO-Link hub. Via fieldbus modules and switches, further branches of the star can be formed and further sensors and/or actuators can be connected to a central collection point, to a master unit, for example.

This type of machine is wherein several signals are often simultaneously applied to individual points and comparatively few connections or data lines are required to transmit data signals.

In contrast thereto, intralogistics systems, for example, in particular conveying systems usually form a line, only a few signals having to be processed at individual points set up in a chain. Due to the star arrangement of sensors and/actuators also mostly used in these systems, it is often necessary to lay several lines in parallel to be able to transmit data signals between the collection points and the sensors and/or actuators. This in turn leads to the necessity of a large number of, above all, long lines. The installation is thus often complex, expensive and prone to errors.

The object of the present disclosure is to eliminate these drawbacks known from the prior art in a simple and cost-effective manner.

SUMMARY

According to the present disclosure, this object is achieved by a modular communication system for connection to a master unit, comprising a device configured in a decentralized manner. The device includes at least a first module and a second module, wherein the first module is configured and set up to be directly connected to the master unit. The second module is directly connected to the first module and is configured and set up to be indirectly connected to the master unit via the first module. The first module is further configured and set up to receive a data signal from the master unit. The data signal comprises at least a first data set usable by the first module, and at least a second data set usable by the second module.

The basic idea is to connect modules having the same or a similar function to form a device and to thus create a modular device which is distributed across the space.

Technologically, the first module constitutes an interface to the master unit. The subsequent modules exchange their data with the respective preceding module, i.e. the second module with the first module, for example. The preceding module may be the one which is one step (node) closer towards the master unit. The preceding module is thus directly connected (via a communication line) to the corresponding module. The resulting physical topology may in particular be a point-to-point structure.

As the data signal comprises a plurality of data sets, these data sets can be forwarded from module to module within the device until they reach the module intended therefor. Long and in particular parallel data lines are not required therefor.

A communication in the reverse direction is of course also possible, i.e. a transfer of data sets or data signals from one module to the preceding module and/or to the master unit.

The distributed device may be expandable in a modular manner by adding at least one further module to the communication system. The added module can be connected to the second module.

However, it may also be provided that the third module is connected to the first module, so that starting from the first module, for example two communication strings are formed the initial points of which are the second module or the third module, respectively, which are both connected to the first module. Further modules can in turn follow the second module and/or the third module. In this case, the third module may also be referred to as the second module.

According to one aspect, at least the first module can be configured and set up to use and/or to modify the data signal received from the master unit to forward a modified data signal to the second module. The first module may for example use the first data set and remove it from the data signal, resulting in a modified data signal which comprises a smaller amount of data. This measure can for example reduce the amount of data to be transmitted to the second module.

In a preferred embodiment, the communication system is configured as an IO-Link communication system, the master unit being an IO-Link master, and the device being an IO-Link device. The configuration as an IO-Link communication system enables a seamless and standardized communication between the modules and the master unit, the master unit being also adapted to provide the power supply to the modules. Furthermore, the use of IO-Link technology enables the modules to be configured and/or replaced in a technically simple manner.

It may also be provided that the modules are arranged spaced apart from each other so as to form a chain extending across a space. The communication system can thus be integrated in large and/or elongated industrial plants such as conveying systems and/or factory buildings at comparatively low installation and material costs.

A further aspect provides that the first and the second module are structurally identical. The permits a particularly simple installation and reduces the susceptibility to errors of the communication system.

It is further conceivable that the communication system comprises a third module which is part of the device configured in a decentralized manner. The third module is directly connected to the second module and is indirectly connected to the first module and the master unit via the second module. Of course, more than three modules may be provided. Depending on the intended application, the communication system may be extended in a technically simple manner and can be adapted exactly to the respective requirements.

In a further variant, the modules of the communication system are each interconnected by point-to-point connections. The first module may in particular be configured and set up to be connected to the master unit also by a point-to-point connection.

In particular point-to-point communication standards such as RS232, RS42, UART, LVDS, modulated communication (FSK, ASK, PSK and derived methods), USB and/or bus communication standards such as I²C I I²S, LIN, RS485, and CAN may be suitable for communication via point-to-point connections (this list is of course not to be understood as being restrictive).

It may be provided that two or more of the connections are based on different communication standards.

The term "different communication standards" can also be understood to mean that the same communication physics (for example the same voltage) is used, but modified and/or restricted protocols are used for communication.

Therefore, subsequent modules can for example be configured at lower cost, in particular if they do not contain IO-Link technology.

In particular, more comprehensive protocols may be provided for communication between the master unit and the first module than for communication between the individual modules.

It is for example possible to use IO-Link protocols for communication between the master unit and the first module. The communication between the individual modules can at the same time be based on other protocols which make use of IO-Link physics, but in which a smaller amount of data is transmitted. This can increase the overall data processing and/or data transmission speed.

In this context, the use of protocols developed specifically for the application and/or proprietary protocols is also conceivable.

The communication system may in particular comprise the master unit.

In a preferred variant embodiment, the first module is a gateway which establishes a connection of the decentralized device to the master unit. It is in particular conceivable, that the first module is a gateway between an IO-Link system and a proprietary system, for example the decentralized device.

Preferably, the first module is configured and set up such that the master unit, when communicating with the decentralized device, recognizes only the first module and/or communicates directly only with the first module.

In this context, it may be provided that the gateway interprets and/or modifies data on an application-oriented layer of the OSI reference model ("Open System Interconnection"—OSI), in particular on layer 6 ("Presentation layer") and/or layer 7 ("Application layer"). An amount of data to be transmitted can thus be reduced, which saves resources.

Preferably, the first module is configured and set up to evaluate, interpret, recompile user data transmitted from the master unit to the first module, and then to forward it to a subsequent module, in particular the second module. Of course, this type of communication is also possible in the reverse direction, i.e. from the decentralized device to the master unit. In this case, user data is also evaluated, interpreted and recompiled by the first module before being forwarded to the master unit.

The subsequent modules can act according to the same principle or use other communication mechanisms which differ therefrom.

Thus, in contrast to conventional fieldbuses, not only a forwarding (routing) of the user data is carried out, but also an evaluation, interpretation and compilation, i.e. a modification thereof.

User data of the layer(s) 6 and/or 7 of the OSI reference model is interpreted and manipulated, in particular thus modified by the first module before being forwarded.

In this context, it is also conceivable that the first module is configured and set up to compile data from the subsequent modules and to transfer it to the master as a data frame. The data frame may in particular also have a different length than other data frames used for communication between the first module and the subsequent modules. Data frames forwarded from the subsequent modules to the first module can be interpreted by the first module, and the data can be compiled to a new data frame which is then forwarded to the master unit.

Preferably, the first module and the second module are configured and set up to send user data having a size of less than one byte to the respective other module or to receive this data from the other module.

In particular, it may be provided that the first module and/or the second module are configured and set up to collect, generate, output and/or forward user data having a size of 1 bit, i.e. in particular small amounts of data. The user data may also have a size of 2 bits or more, for example up to 96 bytes.

In comparison to conventional fieldbus systems and/or conventional I/O-Link systems in which usually at least 3 bytes of user data are exchanged, resources can thus be saved.

In this respect, it is provided, among other things, that user data having a size of less than 3 bytes per module are also exchanged. In other words, it is provided for the individual module that the user data of the appropriate module has a size of less than 3 bytes. In other words, the first module, the second module and further modules can each provide user data having a size of less than 3 bytes, in particular to the first module which is adapted to be connected to the master unit. The data frame for the master unit can then again be (at least) 3 bytes.

It may further be provided that the first module includes additional digital and/or analog inputs and/or outputs for acquiring data. The first module may thus be a gateway which integrates additional functions of fieldbus components.

For example, the first module may be configured as a luminaire or as a valve block which acquires corresponding luminaire or valve block data. The first module can collect and manipulate this data along with further data of subsequent modules and then forward it to the master unit.

Furthermore, the object is achieved according to the present disclosure by a summing frame method, in particular for operating a communication system as described above, comprising the steps of:

sending a data signal from the master unit to the first module, wherein the data signal comprises at least a first data set for operating the first module and a second data set for operating the second module;

using the first data set for operating the first module;

modifying the data signal by removing at least the first data set from the data signal so that a modified data signal is obtained;

sending the modified data signal from the first module to the second module;

receiving the modified data signal by the second module, and using the second data set for operating the second module.

In the summing frame method, all data sets from the master are first send to the first module by means of the data signal. The first module takes out the data set intended for it and sends the remaining data sets to the second module. This procedure is repeated with the corresponding subsequent modules until each module has received the intended data set.

If there are two communication strings starting from the first module, the first module can modify the data signal such that the modified data signal is processed only by the intended one of the two communication strings.

Of course, the method also works in the reverse direction, i.e. from the modules to the master. This this end, the last module sends its data or a data set in the form of a data signal to the preceding module. The latter in turn enriches the data signal with its own data and in turn forwards it to the preceding module. The procedure is repeated until the data signal reaches the master unit.

According to the present disclosure, the object is further achieved by a block frame method, in particular for operating a communication system as described above, comprising the steps of:

sending a data signal from the master unit to the first module, wherein the data signal comprises at least a first data set for operating the first module and a second data set for operating the second module;

using the first data set for operating the first module;

sending the data signal from the first module to the second module;

receiving the data signal by the second module; and using the second data set for operating the second module.

In contrast to the summing frame method, the data signal is passed unmodified between the modules. The advantage of this method is that a plurality of modules can access the same data. This in particular reduces the susceptibility to errors during data transmission.

According to the present disclosure, the object is furthermore achieved by an indexing method, in particular for operating a communication system as describe above, comprising the steps of:

marking a data set with an index;

sending a data signal comprising the data set with the index from the master unit to the first module;

comparing the index with a comparative value by the first module;

using the data set by the first module in case the index corresponds to the comparative value, or modifying the index and forwarding a modified data signal comprising the data set to the second module in case the index does not correspond to the comparative value.

There are two basic approaches for the indexing method.

On the one hand, a request by the master can be passed through the modules and answered by the target module, the index being manipulated in accordance with the method described above.

On the other hand, it may be provided that the indices of all modules are always available in the first module. If the content of an index changes, an exchange is initiated. The response time to the master is thus shortened.

In the communication system, in particular the communication system configured as an IO-Link, the indexing method is particularly suitable for the transmission of acyclic data, in particular of data which are transmitted only if required and/or when certain events occur.

The advantages and properties discussed with respect to the communication system of course also apply accordingly to the methods described above.

BRIEF DESCRIPTION OF THE DRAWINGS

Further features and advantages of the present disclosure will become apparent from the description below and from the drawings to which reference is made and in which.

DETAILED DESCRIPTION

Figure 1:
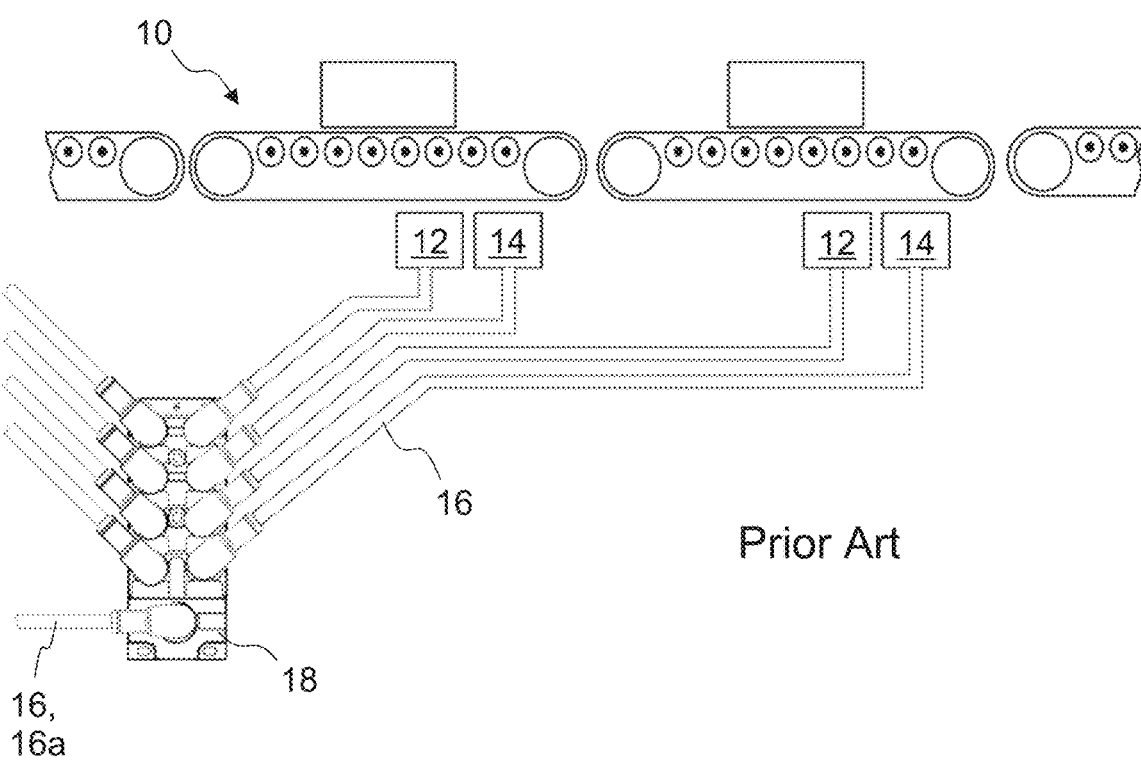
FIG. 1 shows a schematic representation of an arrangement of sensors and actuators in an industrial plant known from the prior art.

FIG. 1 shows a schematic representation of an industrial plant 10 which is configured as a conveying system and extends in an elongated manner across a space. Several sensors 12 and actuators 14 which serve to monitor and control the industrial plant 10 are arranged along the industrial plant 10.

The sensors 12 and actuators 14 are connected in a conventional manner to a collection point 18, for example a hub in a star-shaped configuration via connections 16. The hub can in turn be connected, along with further hubs and/or further sensors 12 and/or actuators 14, in a star-shaped manner to further collection points 18, for example a master unit (not shown). In the following examples, the connection 16 to the master unit and referred to in a simplified way as master connection 16a.

As can be seen in FIG. 1, to implement the conventional star-shaped topology, a plurality of connections 16 have to be arranged in parallel to connect all sensors 12 and actuators 14 to the collection point 18. In other word, a complicated and cost-intensive cabling is required.

Figure 2:
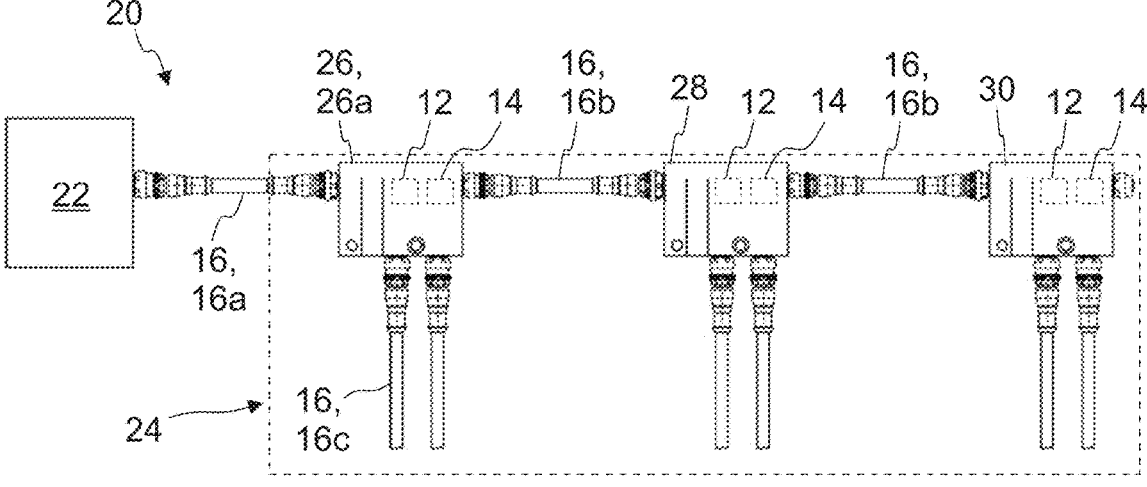
FIG. 2 shows a schematic representation of a communication system according to an embodiment of the present disclosure.

For comparison, FIG. 2 shows a schematic representation of a modular communication system 20 according to an embodiment of the present disclosure, which is particularly suitable for use in industrial plants 10, such as the industrial plant shown in FIG. 1.

The communication system 20 comprises a master unit 22 and a device 24 configured in a decentralized manner.

In the example embodiment, the device 24 configured in a decentralized manner comprises a first module 26, a second module 28 of identical construction, and a third module 30 of identical construction.

Of course, this is not to be understood in a restrictive manner. The decentralized device 24 can in particular also comprise more than three modules 26, 28, 30.

In the example embodiment, the modules 26, 28, 30 are arranged spaced apart from each other so as to form a chain which extends across a space, for example along an industrial plant 10, as that shown in FIG. 1.

The first module 26 is directly connected to the master unit 22. The second module 28 is directly connected to the first module 26 and is indirectly connected to the master unit 22 via the first module 26. The third module 30 is directly connected to the second module 28 and is indirectly connected to the master unit 22 via the second module 28 and the first module 26.

In the example embodiment, the connections 16 between the modules 26, 28, 30 (hereinafter referred to as module connections 16b) are configured as point-to-point connections 16. The connection 16 from the decentralized device

24 to the master unit 22 (i.e. the master connection 16a) is configured in the same way. In the example embodiment, the module connections 16b and the master connection 16a are realized by at least three-core cables, in particular by four-core or five-core cables.

The module connections 16b can be based on different communication standards. It is in particular conceivable that individual module connections 16b are based on radio and/or WLAN technology and/or IO-Link Wireless, while other module connections 16b are implemented by standard sensor cables.

In the example embodiment, the communication system 20 is configured as an IO-Link communication system. The master unit 22 is an IO-Link master, and the decentralized device 24 is an IO-Link device.

IO-Link standard protocols are used for communication between the master unit 22 and the first module 26 via the master connection 16a. However, the communication between the individual modules 26, 28, 30 is based on protocols which make use of IO-Link physics, but in which a smaller amount of data is transmitted compared to the standard protocols.

Of course, this is not to be understood in a restrictive way. Communication based on IO-Link standard protocols between the individual modules 26, 28, 30 is also possible.

In the example embodiment, the first module 26 is a gateway 26a and establishes the master connection 16a of the decentralized device 24 to the master unit 22. The first module 26 is thus a gateway 26a between an IO-Link master and a proprietary system (the decentralized device 24).

The first module 26 is configured and set up such that the master unit 22 communicates directly only with the first module 26 when communicating with the decentralized device 24.

The gateway 26a is configured and set up to interpret and modify data from the master unit 22 on an application-oriented layer of the OSI reference model, in particular layer 6 ("Presentation layer") and/or layer 7 ("Application layer"), and to forward modified data resulting therefrom to the decentralized device 24. The gateway 26a can also interpret and modify data on an application-oriented layer of the OSI reference model, in particular layer 6 and/or layer 7, in the reverse direction, i.e. from the decentralized device 24 to the master unit 22 before forwarding.

In the example embodiment, the data is user data ("Payload").

The first module 26 is thus configured and set up to evaluate, interpret, recompile user data transmitted from the master unit 22 to the first module 26 and then to forward it to a subsequent module, in particular the second module 28. The corresponding user data is thus not simply forwarded, but at least evaluated, interpreted and recompiled before being forwarded to the subsequent module.

As explained above, this type of communication is also possible in the reverse direction, i.e. from the decentralized device 24 to the master unit 22. In this case, too, user data is evaluated, interpreted and recompiled by the first module 26 before being forwarded to the master unit 22.

Optionally, the second module 28 and the third module 30 can also act according to the same principle. They can also interpret and manipulate user data, in particular on the layers 6 and 7 of the OSI reference model.

In the example embodiment, the first module 26 is further configured and set up to compile user data from the subsequent modules and transfer it to the master unit 22 as a data frame. Data frames are also used for communication between the first module 26, the second module 28 and the third module 30. However, they have a shorter length than the data frame used for communication between the master unit 22 and the first module 26.

In the example embodiment, data frames forwarded from the subsequent modules to the first module 26 are thus interpreted by the first module 26, and the data is assembled to a new data frame which is then forwarded to the master unit 22.

A further particular feature of the example embodiment is that the first module 26, the second module 28 and the third module 30 are each configured and set up to generate, collect, output and/or forward user data having a size of 1 bit up to 96 bytes. This enables a very resource-efficient communication and accordingly a lean hardware configuration.

The modules 26, 28, 30 may each themselves comprise sensors 12 and/or actuators 14.

Alternatively or additionally, further sensors 12 and/or actuators 14 can be connected to the respective modules 26, 28, 30, for example via the connections 16 shown in FIG. 2 at the lower end of the illustration (hereinafter referred to as sensor and/or actuator connections 16c). In the example embodiment, the sensor and/or actuator connections 16c are implemented by at least two-core cables. In the example embodiment, the first module 26 is therefore a gateway 26a having additional functions for acquiring data.

It is in particular conceivable that different communication standards or protocols are respectively used for the communication via the sensor and/or actuator connections 16c, the module connections 16b and the master connection 16a.

Alternatively or additionally, the first module 26, the second module 28 and/or the third module 30 may themselves be a sensor 12 and/or an actuator 14. The modules 26, 28, 30 may for example each be configured as industrial luminaires. The modules 26, 28, 28 may each acquire, receive and/or modify data and emit light signals based on that data, for example.

Figure 3:
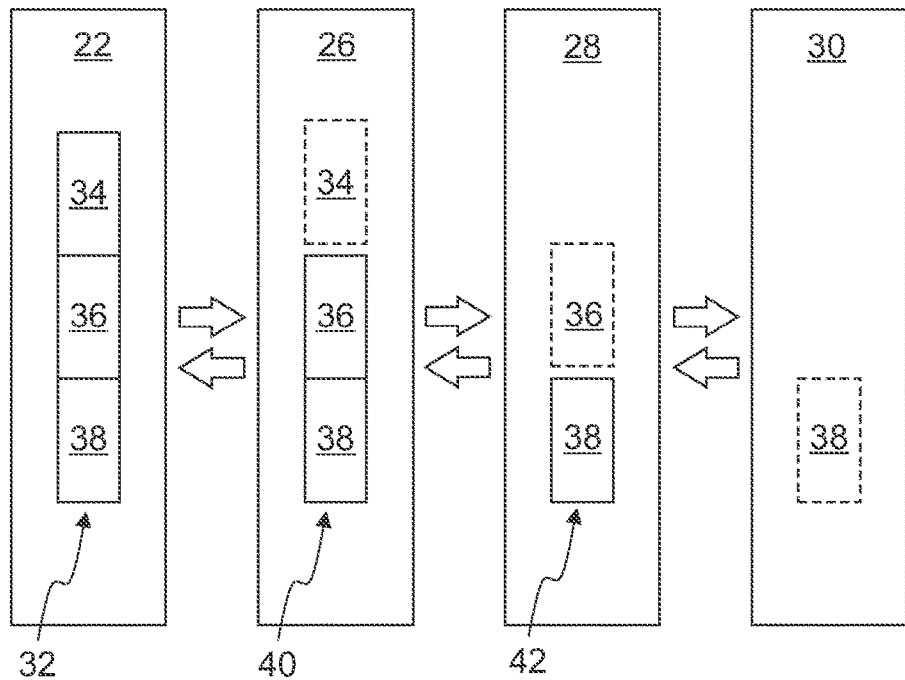
FIG. 3 shows a schematic representation of a summing frame method according to an embodiment of the present disclosure.

As schematically outlined in FIG. 3, the master unit 22 is configured and set up to transmit a data signal 32 to the first module 26. The first module 26 is configured and set up to receive the data signal 32. The data signal 32 comprises a first data set 34 which is usable by the first module 26, a second data set 36 which is usable by the second module 28, and a third data set 38 which is usable by the third module 30. The data sets 34, 36, 38 may be, for example, commands for operating the actuators 14 or for reading out sensor data.

The first module 26 is configured and set up to use the data signal 32 received from the master unit 22, to modify it such that a modified data signal 40 is generated, and then to forward it to the second module 28.

The second module 28 is configured and set up to use the modified data signal 40 received from the first module 26, modify it again and then forward it to the third module 30.

Furthermore, the modules 26, 28, 30 are each configured and set up to receive, use, modify and forward data signals 32, 40 with data sets 34, 36, 38 also in the reverse direction, i.e. to the master unit 22.

The communication system 20 can be operated using one or more different methods for the purpose of data transmission.

These are briefly explained below with reference to example embodiments.

FIG. 3 shows a schematic representation of a summing frame method according to an embodiment of the present disclosure for operating the communication system 20.

In a first step of the method, the master unit 22 sends a data signal 32 to the first module 26. It comprises a first data set 34 for operating the first module 26, a second data set 36 for operating the second module 28, and a third data set 38 for operating the third module 30.

In a second step, the first module 26 uses the first data set 34 to operate an actuator 14, for example.

In a third step of the method, the first module 26 modifies the data signal 32. In the example embodiment, it deletes the first data set 34 from the data signal 32 so that a modified signal 40 is generated which contains only the second and the third data set 36, 38.

In the subsequent fourth step, the amount of data to be transmitted can thus be reduced when sending the modified data signal 40 from the first module 26 to the second module 28.

In a fifth step, the second module 28 receives the modified data signal 40.

In a sixth step, the second module 28 then uses the second data set 36 for operational purposes.

In further subsequent method steps, the second module 28 can again modify the modified data signal 40, for example by deleting the second data set 36 so that a data signal 42 again modified is generated.

The again modified data signal 42 can then be forwarded to the third module 30 and can be used by the latter for operation.

The method is of course also suitable for operating communication systems 20 having a plurality of further modules.

Furthermore, the method also works in the reverse direction.

To this end, the third module 30 for example transmits a data signal 32 with a third data set 38 (in this example, the term "third data set" refers to the fact that the data set originates from the third module 30) which may for example include sensor data of the third module 30, to the second module 28. The second module 28 enriches the data signal 32 with a second data set 36 and forwards it to the first module 26. The latter can in turn add a further (first) data set 34 and forward the collected data sets 34, 36, 38 to the master unit 22.

Figure 4:
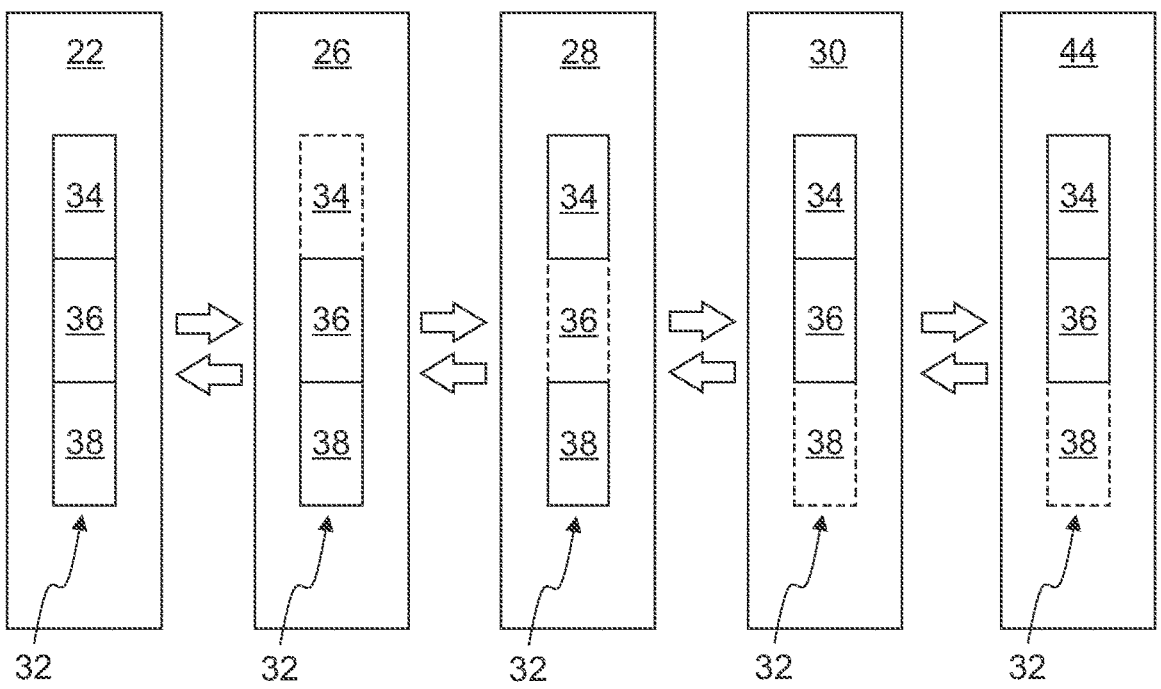
FIG. 4 shows a schematic representation of a block frame method according to an embodiment of the present disclosure.

FIG. 4 shows a schematic representation of a block frame method according to an embodiment of the present disclosure, which can be used as an alternative or in addition to the summing frame method for operating the communication system 20.

In the example embodiment, the first two method steps of the block frame method correspond to those of the summing frame method.

However, in contrast to the summing frame method, the first module 26 forwards the data signal 32 unmodified to the second module 28 in a third method step.

In a fourth method step of the block frame method, the second module 28 receives the data signal 32.

In a fifth method step, the second module 28 then uses the second data set 36 for operational purposes.

In a further subsequent method step, the second module 28 can forward the data signal 32 to the third module 30. The third data set 38 can then be used by the third module 30 for operation.

The method can of course also be used for operating modular communication systems 20 having more than three modules 26, 28, 30.

It is for example conceivable that a fourth module 44 is provided which is structurally identical to the third module 30 and/or is provided for the same function and/or forms a functional twin to the third module 30 and which can be operated using the same data set (the third data set 38).

In this case, the third module 30 can forward the data signal 32 to the fourth module 44.

The fourth module 44 receives the data signal 32 and uses the third data set 38 for its operation.

Of course, all modules of the device 24 which is configured in a decentralized manner can be structurally identical.

Figure 5:
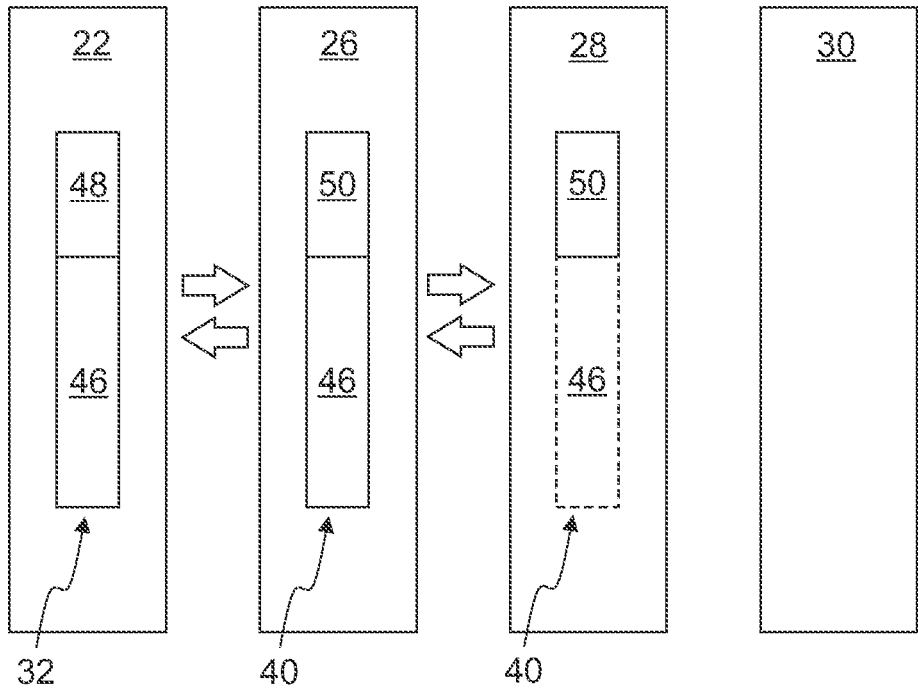
FIG. 5 shows a schematic representation of an indexing method according to an embodiment of the present disclosure.

FIG. 5 shows a schematic representation of an indexing method according to an embodiment of the present disclosure, which can be used as an alternative or in addition to the summing frame method and/or the block frame method for operating the communication system 20.

In a first method step of the indexing method, the master unit 22 marks a specific data set 46 with an index 48.

For example, the specific data set 46 can be intended for operating the second module 28. In the example embodiment, the master unit 22 thus assigns the index 48 with the value "2".

In a second method step, the master unit 22 sends a data signal 32 comprising the specific data set 46 with the index 48 to the first module 26.

In a third method step, the first module 26 compares the index 48 with a comparative value. The comparative value may be "1", for example.

As the comparison in the example embodiment shows that the index 48 (value "2") is greater than the comparative value "1", the first module 26 modifies in a fourth method step the index 48 such that a modified index 50 is generated.

This can be done, for example, by subtracting the comparative value from the index 48. The value of the modified index 50 is then "1" in the example embodiment.

In a fifth method step, the first module 26 then forwards a modified data signal 40 comprising the specific data set 46 and the modified index 50 to the second module 28.

The second module 28 compares the value of the modified index 50 with the comparative value. As both the value of the modified index 50 and the comparative value are "1" and thus match, the second module 28 uses the specific data set 46 for operation.

Data transmission in the reverse direction (to the master unit 22) works in the reverse manner. A module 28 sends a specific data set 46 with an index 48 to the preceding module 26. The latter increases the index 48 by the comparative value and forwards the specific data set 46 with the modified index 50 accordingly. The first module 26 then provides the information to the master unit 22.

In principle, the modular communication system 20 is modularly expandable so that additional modules can be incorporated.

The invention claimed is:

1. A modular communication system for connection to a master unit, comprising a device which is configured in a decentralized manner and includes at least a first module and a second module, wherein the first module is configured and set up to be directly connected to the master unit and to communicate with the master unit using IO-Link protocols, wherein the second module is directly connected to the first module and is configured and set up to be indirectly connected to the master unit via the first module, wherein the first module is further configured and set up to receive a data signal from the master unit, and wherein the data signal comprises at least a first data set usable by the first module, and at least a second data set usable by the second module, wherein the first module is a gateway which establishes a connection of the device that is configured in the decentralized manner to the master unit and wherein the first module, being the gateway, interprets and modifies data on application-oriented layer 6 and/or 7 of the Open Systems Interconnection Reference Model.

2. The communication system according to claim 1, wherein the first module is configured and set up to use and/or modify the data signal received from the master unit to forward a modified data signal to the second module.

3. The communication system according to claim 1, wherein the first module is configured and set up to use and/or modify a data signal received from the second module to forward a modified data signal to the master unit.

4. The communication system according to claim 1, wherein the modules are arranged spaced apart from each other so as to form a chain extending across a space.

5. The communication system according to claim 1, wherein the first and the second module are structurally identical.

6. The communication system according to claim 1, comprising a third module which is part of the device configured in a decentralized manner, wherein the third module is directly connected to the second module and is indirectly connected to the first module via the second module.

7. The communication system according to claim 1, wherein the modules are each interconnected by point-to-point connections.

8. The communication system according to claim 1, wherein the first module is configured and set up to be connected to the master unit by a point-to-point connection, and wherein at least two of the connections are based on different communication standards.

9. The communication system according to claim 1, wherein the first and second module are furthermore configured to communicate with each other using protocols that make use of the communication physics of IO-Link protocols.

10. A modular communication system configured as an IO-Link communication system for connection to an IO-Link master unit, comprising a device which is configured in a decentralized manner and includes at least a first module and a second module, wherein the first module is configured and set up to be directly connected to the master unit, wherein the second module is directly connected to the first module and is configured and set up to be indirectly connected to the master unit via the first module, wherein the first module is further configured and set up to receive a data signal from the master unit, wherein the data signal comprises at least a first data set usable by the first module, and at least a second data set usable by the second module, and wherein the first module is configured to communicate with the master unit using IO-Link protocols, wherein the first module is a gateway which establishes a connection of the device that is configured in a decentralized manner to the master unit, and wherein the first module, being the gateway, interprets and modifies data on the application-oriented layer 6 and/or 7 of the Open Systems Interconnection Reference Model.

11. The communication system according to claim 10, wherein the first and second module are furthermore configured to communicate with each other using protocols that make use of the communication physics of IO-Link protocols.

12. A modular communication system for connection to a master unit, comprising a device which is configured in a decentralized manner and includes at least a first module and a second module, wherein the first module is configured and set up to be directly connected to the master unit, wherein the second module is directly connected to the first module and is configured and set up to be indirectly connected to the master unit via the first module, wherein the first module is further configured and set up to receive a data signal from the master unit, wherein the data signal comprises at least a first data set usable by the first module, and at least a second data set usable by the second module, wherein the first module is a gateway which establishes a connection of the device that is configured in a decentralized manner to the master unit, wherein the first module, being the gateway, interprets and modifies data on application-oriented layer 6 and/or 7 of the Open Systems Interconnection Reference Model, and wherein the first and second module are furthermore configured to communicate with each other using protocols that make use of the communication physics of IO-Link protocols.

* * * * *